United States Patent
Cheng

(10) Patent No.: US 12,479,339 B2
(45) Date of Patent: Nov. 25, 2025

(54) ALERT SYSTEM FOR SAFETY SEAT AND SAFETY SEAT

(71) Applicant: WONDERLAND SWITZERLAND AG, Steinhausen (CH)

(72) Inventor: Manqun Cheng, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 82 days.

(21) Appl. No.: 18/686,750

(22) PCT Filed: Sep. 2, 2022

(86) PCT No.: PCT/EP2022/074466
§ 371 (c)(1),
(2) Date: Feb. 26, 2024

(87) PCT Pub. No.: WO2023/031410
PCT Pub. Date: Mar. 9, 2023

(65) Prior Publication Data
US 2024/0351488 A1   Oct. 24, 2024

(30) Foreign Application Priority Data

Sep. 2, 2021   (CN) .......................... 202111023896.1

(51) Int. Cl.
*G08B 21/00* (2006.01)
*B60N 2/26* (2006.01)
(Continued)

(52) U.S. Cl.
CPC ........... *B60N 2/272* (2023.08); *B60N 2/2812* (2013.01); *B60N 2/2816* (2023.08); *B60R 21/01546* (2014.10)

(58) Field of Classification Search
CPC .... B60N 2/272; B60N 2/2812; B60N 2/2816; B60R 21/01546; B60R 21/01516; G08B 21/22
(Continued)

(56) References Cited

U.S. PATENT DOCUMENTS 7,714,737 B1   5/2010   Morningstar
2002/0063009 A1   5/2002   Oyaski
(Continued)

FOREIGN PATENT DOCUMENTS

CN   106114450 A   11/2016
CN   206426994 U   8/2017
(Continued)

OTHER PUBLICATIONS

International Search Report issued in corresponding International Application No. PCT/EP2022/074466, dated Dec. 1, 2022, pp. 1-3, European Patent Office, Rijswijk, Netherlands.
(Continued)

*Primary Examiner* — Mark S Rushing
(74) *Attorney, Agent, or Firm* — HAUPTMAN HAM, LLP

(57) ABSTRACT

A safety seat with an alert function includes a seat body, a seat belt, and a buckle assembly. The buckle assembly is installed on the seat body in a seesaw structure. The alert system includes a control module, and a position sensor and a buckle sensor which are electrically connected to the control module. The position sensor is on the buckle assembly. The buckle sensor is in a buckle component of the buckle assembly. When the control module determines that the position sensor is triggered and the seat belt is not buckled to the buckle component, the control module sends
(Continued)

an alert signal to remind parents or drivers to engage the buckle component in time to ensure the safety of a child on the safety seat.

9 Claims, 6 Drawing Sheets

(51) Int. Cl.
  *B60N 2/28* (2006.01)
  *B60R 21/015* (2006.01)
(58) Field of Classification Search
  USPC .................................................... 340/457.1
  See application file for complete search history.

(56) References Cited

U.S. PATENT DOCUMENTS

| | | | |
|---|---|---|---|
| 2003/0075969 A1* | 4/2003 | Fromme | B60R 22/48 |
| | | | 297/468 |
| 2005/0092539 A1* | 5/2005 | Chitalia | B60N 2/272 |
| | | | 180/271 |
| 2006/0000657 A1* | 1/2006 | Gray | B60R 21/01556 |
| | | | 180/286 |
| 2008/0246316 A1* | 10/2008 | Carine | B60N 2/2821 |
| | | | 297/217.2 |
| 2009/0079557 A1 | 3/2009 | Miner | |
| 2014/0085070 A1* | 3/2014 | Schoenberg | B60N 2/268 |
| | | | 340/457.1 |
| 2017/0236395 A1 | 8/2017 | Cech | |
| 2017/0240111 A1* | 8/2017 | Appukutty | B60K 35/22 |
| 2019/0176736 A1 | 6/2019 | Jang | |

FOREIGN PATENT DOCUMENTS

| | | |
|---|---|---|
| CN | 107249928 A | 10/2017 |
| CN | 109070836 A | 12/2018 |
| CN | 110239405 A | 9/2019 |
| CN | 113043920 A | 6/2021 |
| CN | 215883402 U | 2/2022 |
| DE | 102016121148 A1 | 5/2017 |
| EP | 1295759 A2 | 3/2003 |

OTHER PUBLICATIONS

Written Opinion issued in corresponding International Application No. PCT/EP2022/074466, dated Dec. 1, 2022, pp. 1-4, European Patent Office, Rijswijk, Netherlands.

Taiwan Office Action issued in corresponding Taiwan Application No. 111133358, dated Aug. 7, 2023, pp. 1-7.

First Office Action in Corresponding Chinese Application No. 202111023896.1, dated May 12, 2025; 13 pgs.

\* cited by examiner

ALERT SYSTEM FOR SAFETY SEAT AND SAFETY SEAT

CROSS-REFERENCE TO RELATED APPLICATIONS

This application is the national phase under 35 U.S.C. § 371 of PCT International Application No. PCT/EP2022/074466, which has an international filing date of Sep. 2, 2022 and claims priority of Chinese patent application No. 202111023896.1, filed on Sep. 2, 2021, the content of which is hereby incorporated by reference in its entirety.

FIELD OF THE INVENTION

The present disclosure relates to a safety seat, and more particularly to a safety seat with an alert function.

BACKGROUND OF THE INVENTION

Safety seats have become a must-have apparatus for children in a vehicle. They provide a safe and comfortable seating space for children. The safety seat usually uses the seat belt provided thereon to secure the child to the safety seat. The seat belt is usually provided with a buckle for ease of use. However, if the buckle is not engaged, the seat belt cannot hold the child securely on the safety seat. When the vehicle decelerates suddenly, the child may get rid of the safety seat and may be injured. At present, the buckle of the seat belt of the general safety seats does not have a warning function of unbuckling, so that if parents do not buckle the buckle at the first time, they may fail to engage the buckle due to negligence later, resulting in the aforementioned risks. In addition, it is often heard that parents inadvertently leave their child on the safety seat in the vehicle and leave the vehicle, causing injury to the child. At present, the general safety seats have no solution for this either.

SUMMARY OF THE INVENTION

The present disclosure aims at providing an alert system for safety seat, which uses sensors to determine the sitting situation of a child on the safety seat so as to ensure the safety of the child, and a safety seat with the alert system.

This is achieved by an alert system and a safety seat according to claims 1 and 8, respectively. The dependent claims pertain to corresponding further developments and improvements.

As will be seen more clearly from the detailed description following below, according to an embodiment, the claimed alert system is applied to a safety seat. The safety seat has a buckle assembly and at least one seat belt. The buckle assembly has a buckle component. The buckle assembly is installed on a seat portion of the safety seat in a seesaw structure. The alert system includes a position sensor, a buckle sensor, and a control module. The position sensor is disposed on the buckle assembly. When somebody sits on the safety seat, the buckle assembly will be rotated, triggering the position sensor. The buckle sensor is disposed in the buckle component to sense whether the seat belt is buckled to the buckle component. The control module is electrically connected to the buckle sensor and the position sensor. When the control module determines that the position sensor is triggered and the seat belt is not buckled to the buckle component, the control module sends a first alert signal. Therefore, the alert system can use the position sensor and the buckle sensor to determine whether the buckle component is engaged when the child is sitting on the safety seat, so as to remind parents or drivers to engage the buckle component in time to ensure the safety of the child.

In an embodiment, the position sensor is a gyroscope.

In an embodiment, the position sensor is an accelerometer.

In an embodiment, the alert system further includes an alert module electrically connected to the control module to process the first alert signal.

In an embodiment, the alert module includes a light-emitting or sound-emitting component, and when the control module sends the first alert signal, the alert module emits light or sound message.

In an embodiment, the alert system further includes a communication module electrically connected to the control module and connected in communication with an external mobile device, and when the control module determines that the position sensor is triggered and a single intensity of the communication connection with the mobile device decreases to a predetermined value, the control module sends the first alert signal.

In an embodiment, the communication module is further connected in communication with a vehicle control system, and when the control module determines that the position sensor is triggered and the single intensity of the communication connection with the mobile device decreases to a predetermined value, the control module sends a second alert signal to the vehicle control system so that a vehicle in which the safety seat is located sends warning message or alerts outward.

According to another embodiment, the claimed safety seat includes a seat body, a seat belt, a buckle assembly and the above alert system. The seat body has a seat portion. The buckle assembly is installed on the seat portion in a seesaw structure. Therefore, the safety seat can use the position sensor and the buckle sensor to determine whether the buckle component is engaged when the child is sitting on the safety seat, so as to remind parents or drivers to engage the buckle component in time to ensure the safety of the child.

In an embodiment, the buckle assembly further includes an actuating portion, a rotating shaft portion, and a buckle portion, the actuating portion and the buckle portion are respectively connected to the rotating shaft portion, an end of the actuating portion that is not connected to the rotating shaft portion is a free end, which is higher than the rotating shaft portion and extends upward and in a direction toward a seat back of the seat body, an end of the buckle portion that is not connected to the rotating shaft portion is a free end, which is higher than the rotating shaft portion and extends upward and in a direction away from a seat back of the seat body, the buckle assembly as a whole is V-shaped, the rotating shaft portion is pivotally connected to the seat portion of the seat body through a rotating shaft or a pin, and the buckle component is disposed on the buckle portion.

In an embodiment, the position sensor is disposed on one of the buckle portion, the rotating shaft portion, and the actuating portion.

BRIEF DESCRIPTION OF THE DRAWINGS

In the following, the present disclosure is further illustrated by way of example, taking reference to the accompanying drawings thereof.

DETAILED DESCRIPTION

Figure 1:
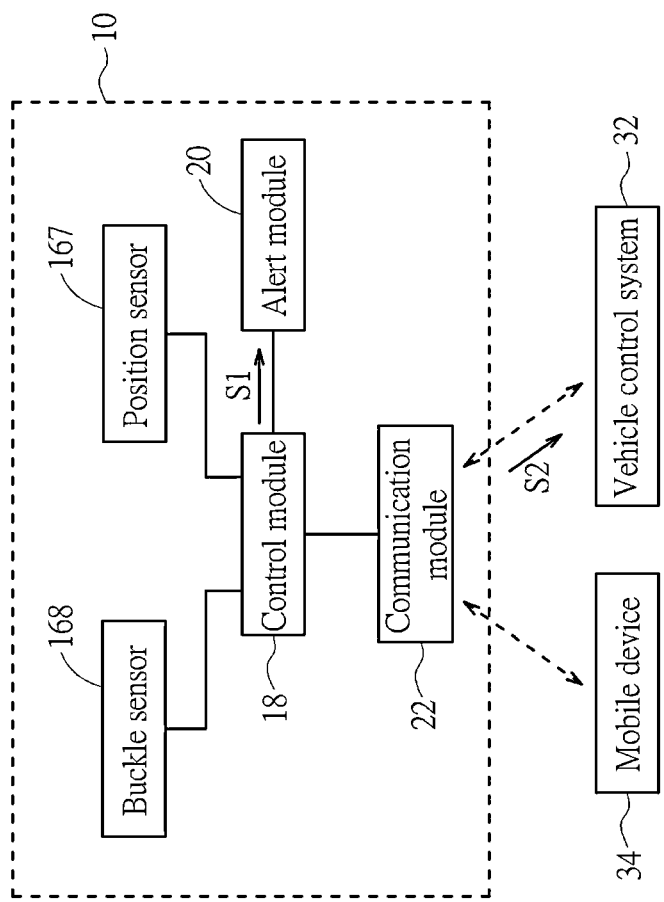
FIG. 1 is a functional block diagram of an alert system for a safety seat according to an embodiment.
Figure 2:
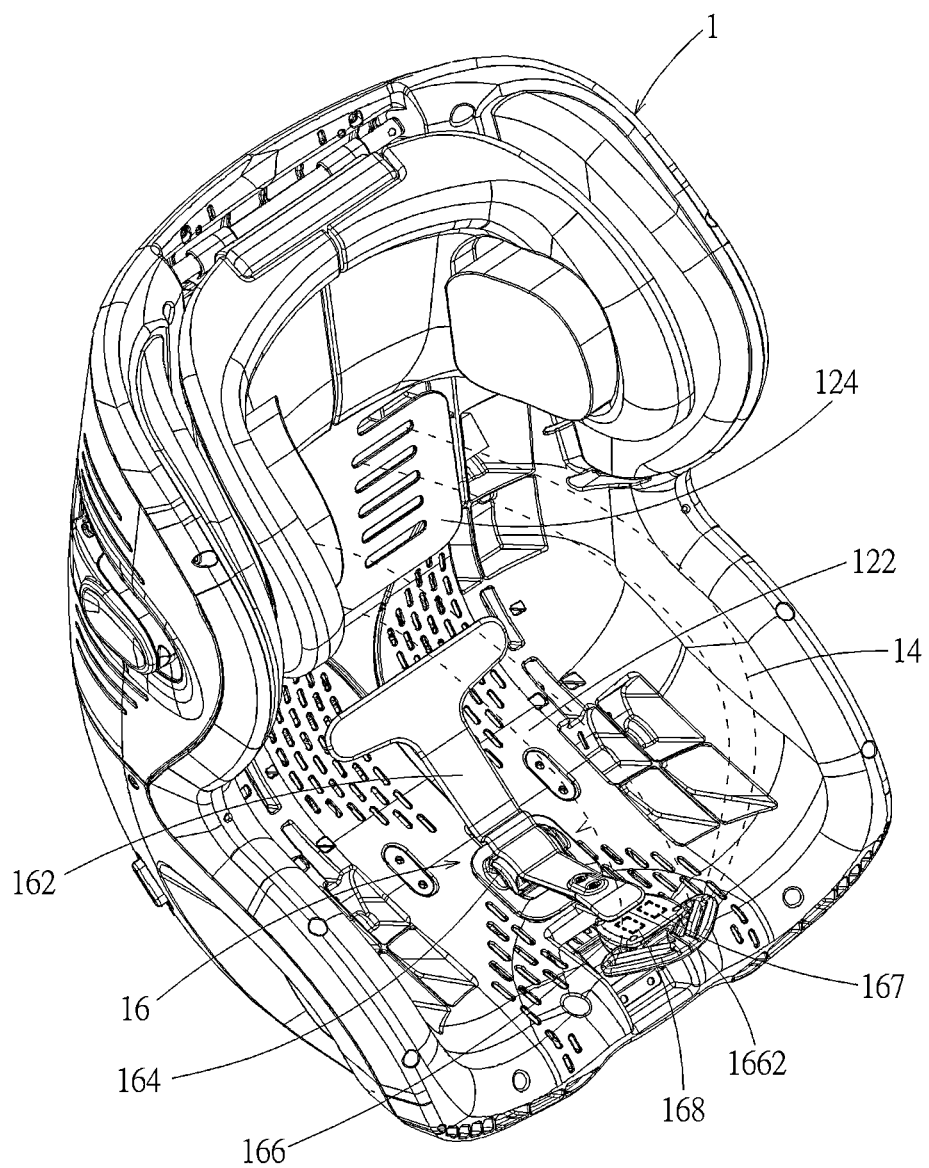
FIG. 2 is a schematic diagram illustrating the safety seat in FIG. 1.
Figure 3:
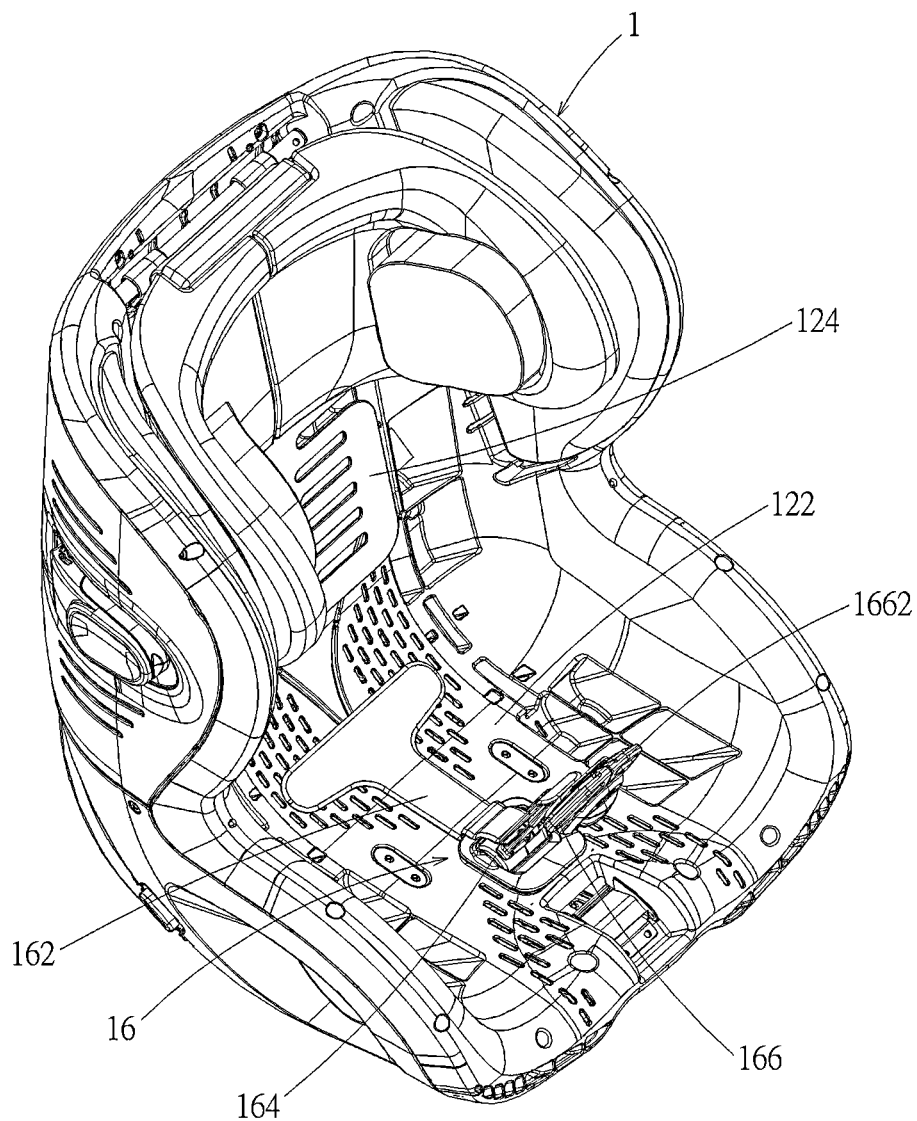
FIG. 3 is a schematic diagram illustrating the safety seat in FIG. 2 after an actuating portion of the safety seat is pressed down.
Figure 4:
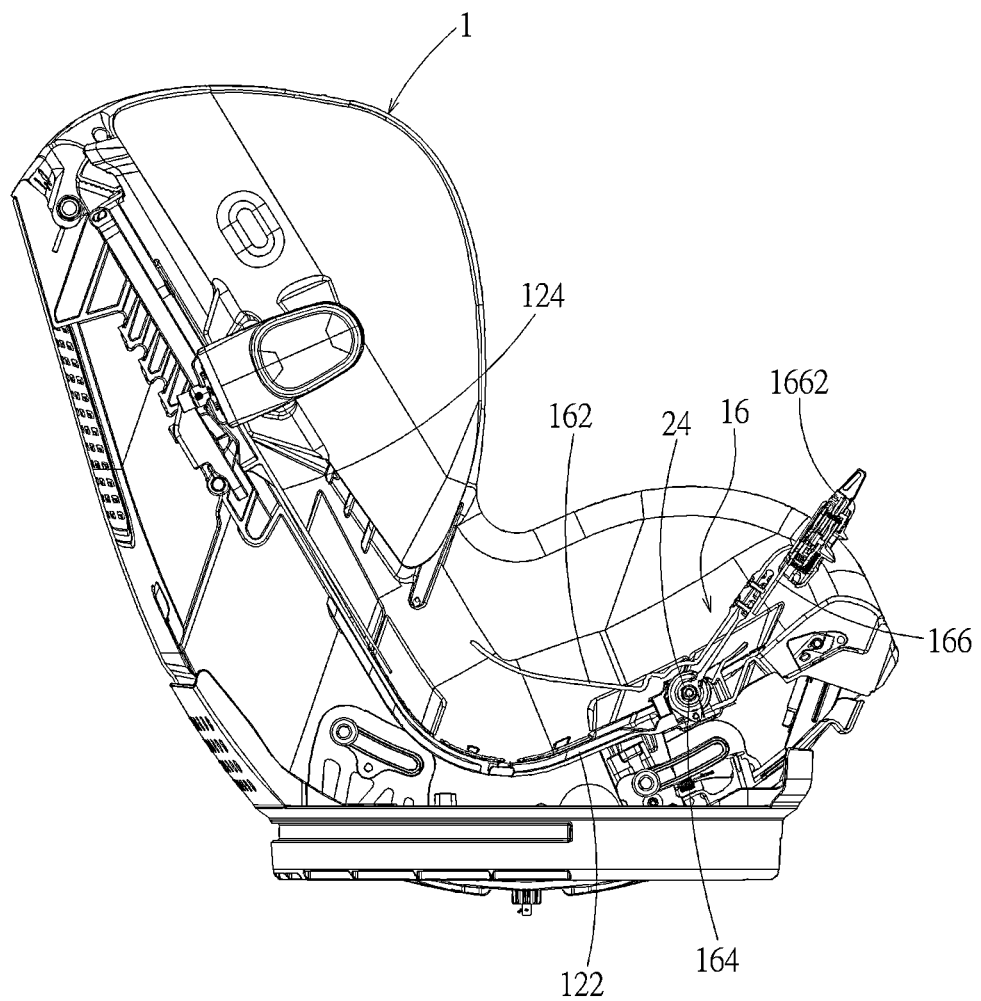
FIG. 4 is a sectional view of the safety seat in FIG. 2.
Figure 5:
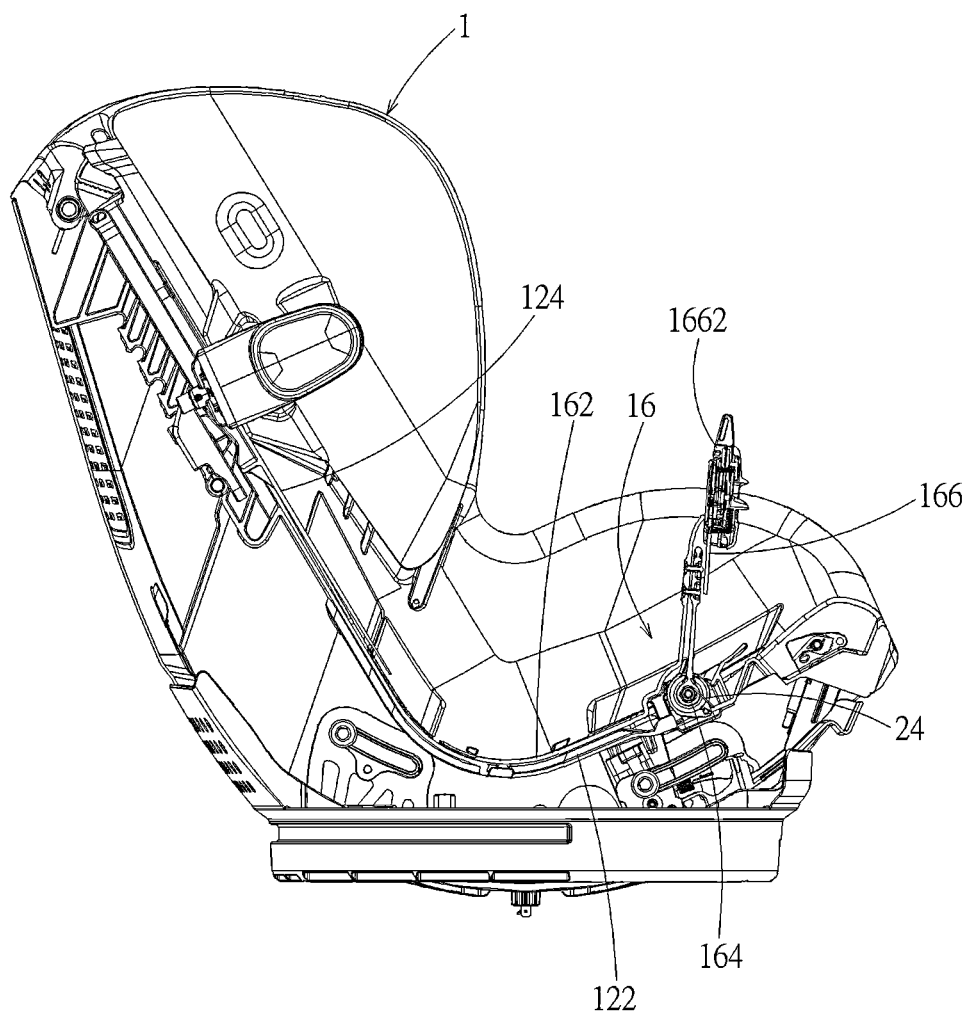
FIG. 5 is a sectional view of the safety seat in FIG. 4 after the actuating portion of the safety seat is pressed down.

Please refer to FIG. 1 to FIG. 3. A safety seat 1 according to an embodiment includes a seat body 12, a seat belt 14 (shown in dashed lines in FIG. 2 only), and a buckle assembly 16. The buckle assembly 16 is disposed on a seat portion 122 of the seat body 12. The buckle assembly 16 includes an actuating portion 162, a rotating shaft portion 164, and a buckle portion 166. The actuating portion 162 extends upward and in a direction toward a seat back 124. An end of the actuating portion 162 is a connection end connected to the rotating shaft portion 164; another end of the actuating portion 162 is a free end that is relatively higher than the rotating shaft portion 164. In contrast, the buckle portion 166 extends upward and in a direction away from the seat back 124. An end of the buckle portion 166 also is a connection end connected to the rotating shaft portion 164; another end of the buckle portion 166 is a free end that is relatively higher than the connection end. Thereby, the buckle assembly 16 as a whole is V-shaped. In addition, a buckle component 1662 is disposed on the free end of the buckle portion 166. The rotating shaft portion 164 pivotally connected to the seat portion 122 through a rotating shaft or a pin, so that the buckle assembly 16 is disposed on the seat portion 122 in a seesaw structure. Therein, the buckle assembly 16 is detachably connected to the seat belt 14 through the buckle component 1662. Therefore, a child can be securely fastened to the safety seat 1 by the seat belt 14.

The safety seat 1 in the embodiment is also provided with a control circuitry 10. The control circuitry 10 includes a control module 18, a position sensor 167 (indicated by a bold frame in FIG. 2), and a buckle sensor 168 (indicated by a bold frame in FIG. 2). The control module 18 is electrically connected to the position sensor 167 and the buckle sensor 168 respectively. In a preferred embodiment, both the position sensor 167 and the buckle sensor 168 are disposed in the buckle component 1662. In other embodiments, the position sensor 167 may also be disposed in the actuating portion 162 or the rotating shaft portion 164; the present disclosure is not limited thereto. In addition, in a preferred embodiment, the position sensor 167 may be a gyroscope. However, those skilled in the art should know that other types of position sensors, such as an accelerometer, can also replace the gyroscope; the present disclosure is not limited thereto.

In a preferred embodiment, the control circuitry 10 also includes a communication module 22 electrically connected to the control module 18. In some embodiments, the communication module 22 may be a Bluetooth module, which can be connected in communication with an external mobile device 34 or a vehicle control system 32 on a vehicle through a Bluetooth transmission interface. In other embodiments, the communication module 22 may also be a short-range communication module such as Wi-Fi, ZigBee or RFID.

In other embodiments, the control circuitry 10 may also be provided with an alert module 20 electrically connected to the control module 18. The alert module 20 can be a light-emitting and/or sound-emitting component.

When the control module 18 senses by the position sensor 167 that the actuating portion 162 is pressed down (as shown in FIG. 3, for example, when a child sits on the seat portion 122 of the safety seat 1, the child's buttocks will press the actuating portion 162 and trigger the position sensor 167) and senses by the buckle sensor 168 that the buckle component 1662 has not been engaged (i.e. the seat belt 14 is not buckled to the buckle component 1662 and the buckle sensor 168 is not triggered), the control module 18 sends a first alert signal S1 (indicated by an arrow in FIG. 1) to the alert module 20. At this time, the alert module 20 may generate emit light and/or sound message in the form of light and/or sound to remind parents or drivers to engage the buckle component 1662 in time to ensure the safety of the child. In addition, in practice, the buckle sensor 168 can be, but is not limited to, a proximity sensor, a limit switch and etc. The control module 18 may be realized by hardware (for example, including a circuit board, and a processing chip, a communication chip, a connection interface, and other required electronic components which are carried on the circuit board), software, or a combination thereof, which will not be described in addition.

In other embodiments, the alerting of the alert module 20 may also be implemented by using a device or system external outside the safety seat 1. For example, the control module 18 is connected in communication with the vehicle control system 32 of the vehicle (with the safety seat 1 installed) through the communication module 22. The control module 18 sends out the first alert signal S1 via the communication module 22. The vehicle control system 32 receives the first alert signal S1, and according to the first alert signal S1, controls a speaker in the vehicle to make a sound, controls a display screen of the vehicle to produce a light effect, displays text and etc., or performs the both, so as to warn people in the vehicle. For another example, the control module 18 is connected in communication with the mobile device 34 (e.g. a smartphone, a wireless key and etc., carried by the parents or driver in the vehicle) through the communication module 22. The smartphone receives the first alert signal S1, and according to the first alert signal S1, controls a speaker of the smartphone (or earphones of the smartphone through communication connection) to make a sound, controls a display screen of the smartphone to flash or display text, etc., controls the smartphone to vibrate, or performs two or three of the above, so as to warn the owner of the smartphone (e.g. the parents or driver). The wireless key receives the first alert signal S1, and according to the first alert signal S1, controls a speaker of the wireless key to make a sound, controls the wireless key to vibrate, controls the wireless key to flash (e.g. through a light-emitting diode), or performs two or three of the above, so as to warn the owner of the wireless key (e.g. the driver). Furthermore, in practice, the above communication connection can be realized not only through direct wire connection, but also through Wi-Fi technology, Bluetooth technology or other short-range communication technologies. The above sounds may include voice, music, and the like. A corresponding mobile application can be executed on the vehicle control system 32 and the smartphone (e.g. mobile device 34) to perform the above operations (alerting according to the first alert signal S1).

Please refer to FIG. 2 to FIG. 5. In the embodiment, the actuating portion 162 and the buckle portion 166 are fixedly connected (both are connected to the rotating shaft portion 164), so that the actuating portion 162 and the buckle portion 166 will also rotate together relative to the seat portion 122. When the actuating portion 162 protrudes upward (for example, when no child sits on the safety seat 1), the rotating shaft portion 164 will rotate forward, so that the buckle component 1662 of the buckle portion 166 will move towards the front of the safety seat 1, which can avoid interfering with the parent moving the child to the seat portion 122, which is convenient for the parent to operate (for example, at this time, the parent does not need to free a hand to toggle the buckle component 1662 when holding a child to the seat portion 122). In addition, in the embodiment, the actuating portion 162 is biased by a torsion spring 24 to tend to move to the protruding position so that when the child is not on the safety seat 1, the actuating portion 162 remains protruding and the buckle component 1662 remains in the relatively forward position.

Please refer to FIG. 1 to FIG. 3. As described above, the safety seat 1 has an alert function. The safety seat 1 and the external device interacting with the safety seat 1 can form an alert system for the safety seat 1 (as shown in FIG. 1). When the control module 18 senses through the position sensor 167 that the actuating portion 162 is pressed down, the control module 18 is connected in communication with the mobile device 34 (e.g. a smartphone, a wireless key, etc.). When the mobile device 34 loses the communication connection signal with the control module 18 or the single intensity of the communication connection between the mobile device 34 and the control module 18 decreases to a predetermined value, the mobile device 34 alerts (for example, controlling the speaker of the smartphone (or earphones of the smartphone through communication connection) to make a sound, controlling the display screen of the smartphone to flash or display text and etc., controlling the smartphone to vibrate, or performs two or three of the above; for another example, the wireless key controls the speaker of the wireless key to make a sound, controls the wireless key to vibrate, controls the wireless key to flash (e.g. through a light-emitting diode), or performs two or three of the above), so as to warn the driver that the child is still on the safety seat 1. Similarly, when the control module 18 can also determine that the position sensor 167 is triggered and the single intensity of the communication connection with the mobile device 34 decreases to a predetermined value, the control module 18 sends the first alert signal S1. Thereby, it can be avoided that the child is inadvertently left on the safety seat 1 in the vehicle when the parents or driver leaves the vehicle, resulting in injury to the child. Therein, whether the communication connection between the mobile device 34 and the control module 18 is interrupted or not depends in principle on the communication technology used and the actual implementation environment. Furthermore, in principle, the single intensity of the communication connection between the mobile device 34 and the control module 18 is related to the distance between the two, so the distance between the mobile device 34 and the control module 18 can be estimated by setting the predetermined value. Thereby, in practice, the distance to trigger the alert (e.g., 5 meters, 10 meters, etc.) can be set first, and then the corresponding single intensity can be deduced and then set as the predetermined value.

Please continue referring to FIG. 1 to FIG. 3. Furthermore, in the embodiment, when the control module 18 loses the communication connection signal with the mobile device 34 or the single intensity of the communication connection between the mobile device 34 and the control module 18 decreases to a predetermined value, the control module 18 also sends a second alert signal S2 (indicated by an arrow in FIG. 1) to the vehicle control system 32 of the vehicle (with the safety seat 1 installed). The vehicle control system 32 sends warning message and/or alerts outward (e.g., controlling a horn of the vehicle to make a sound) according to the second alert signal S2, so as to warn the driver that the child is still on the safety seat 1. Furthermore, the previous descriptions about the predetermined value can also be applied to the predetermined value here, and will not be repeated. Thereby, dual alerts (i.e., the alerts of the mobile device 34 and the vehicle control system 32) can more effectively prevent children from being inadvertently left on the safety seat 1 in the vehicle.

Please continue referring to FIG. 1 to FIG. 3. Furthermore, in the embodiment, the alert system for safety seat 1 also provides another alert mechanism to avoid inadvertently leaving children on the safety seat 1 in the vehicle. When the control module 18 senses through the position sensor 167 that the actuating portion 162 is pressed down (e.g., a child is sitting on the seat portion 122 of the safety seat 1), the control module 18 is connected in communication with the vehicle control system 32. Afterward, when the vehicle control system 32 senses that the vehicle is turned off and a door of the vehicle is opened, the vehicle control system 32 alerts (e.g., controlling the horn of the vehicle to make a sound, controlling the speaker in the vehicle to make a sound, controlling the display screen of the vehicle to produce a light effect displays text, etc., or performs two or three of the above), so as to warn the driver that the child is still on the safety seat 1. In other embodiments, the control module 18 can also send a short message to the mobile device 34 of a caregiver or inform the police system that a child has been left in the vehicle, through the communication module 22. Furthermore, in practice, the above various alert mechanisms to avoid inadvertently leaving children on the safety seat 1 in the vehicle can also be used concurrently.

Figure 6:
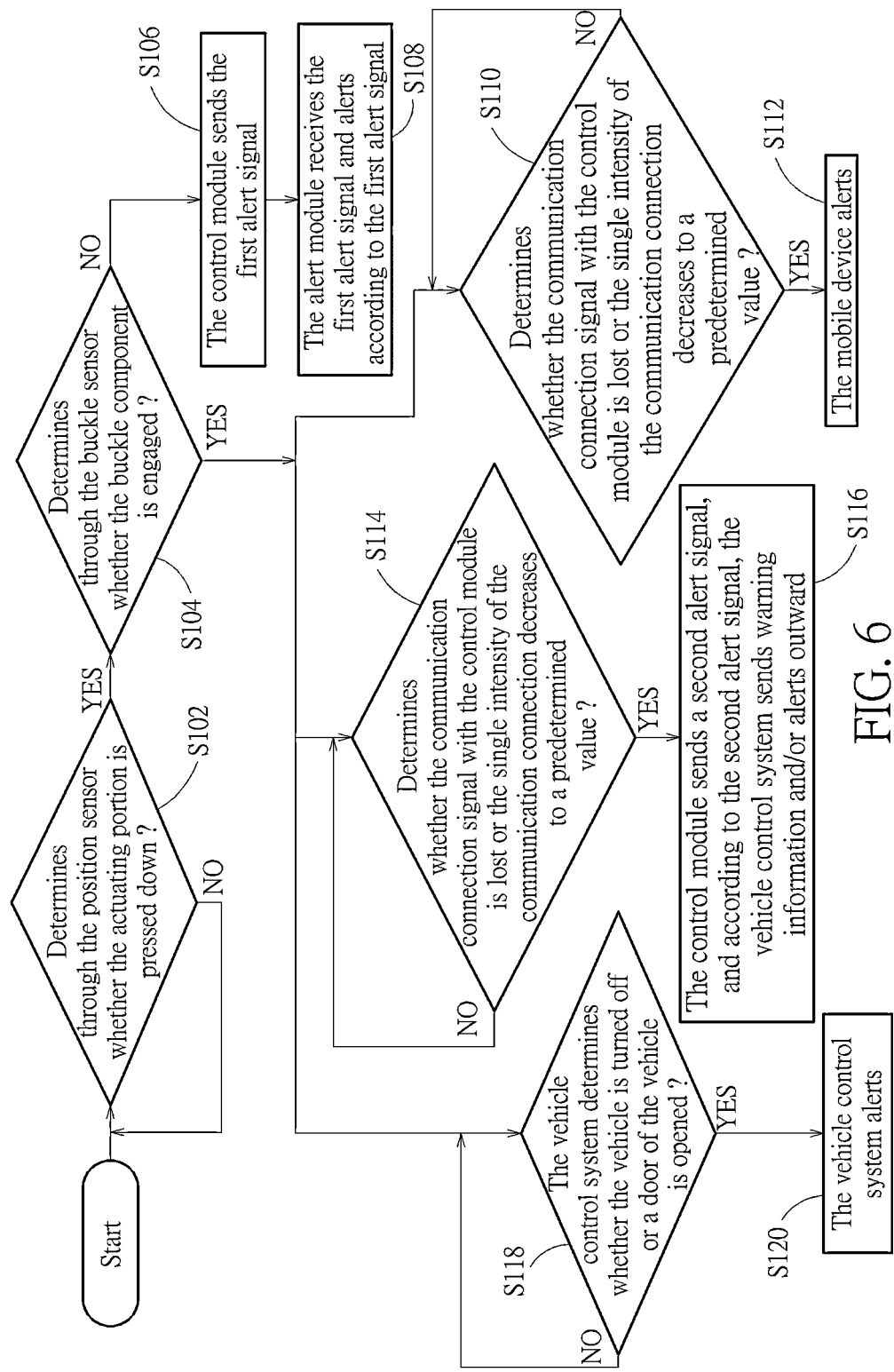
FIG. 6 is a flow chart of an actual application according to an alert system for the safety seat in FIG. 1.

Please refer to FIG. 6. In practice, the alert system for the safety seat 1 can in principle be implemented according to the flow chart shown in FIG. 6. For the descriptions of each component of the safety seat 1, please refer to the relevant descriptions in the foregoing and corresponding drawings, which will not be repeated. As shown by the step S102, the control module 18 determines through the position sensor 167 whether the actuating portion 162 is pressed down. If the determination is NO, the flow returns to the step S102. If the determination is YES, the control module 18 determines through the buckle sensor 168 whether the buckle component 1662 is engaged, as shown by the step S104. If the determination in the step S104 is NO, the control module 18 sends the first alert signal S1, as shown by the step S106. The alert module 20 receives the first alert signal S1 and alerts according to the first alert signal S1, shown as the step S108. If the determination in the step S104 is YES, the above various alert mechanisms to avoid inadvertently leaving children on the safety seat 1 in the car will be carried out, which will be described later. Furthermore, at this time, in principle, the control module 18 has been connected in communication with the mobile device 34 and the vehicle control system 32 of the vehicle.

Please continue referring to FIG. 6. As shown by the step S110, the mobile device 34 determines whether the communication connection signal with the control module 18 is lost or whether the single intensity of the communication connection between the mobile device 34 and the control module 18 decreases to a predetermined value. If the determination in the step S110 is NO, the flow returns to the step S110. If the determination in the step S110 is YES, the mobile device 34 alerts, as shown by the step S112. Furthermore, as shown by the step S114, the control module 18 determines whether the communication connection signal with the control module 18 is lost or whether the single intensity of the communication connection between the mobile device 34 and the control module 18 decreases to a predetermined value. If the determination in the step S114 is NO, the flow returns to the step S114. If the determination in the step S114 is YES, the control module 18 sends a second alert signal S2 to the vehicle control system 32, and according to the second alert signal S2, the vehicle control system 32 sends warning message and/or alerts outward, as shown by the step S116. Furthermore, as shown by the step S118, the vehicle control system 32 determines whether the vehicle is turned off or a door of the vehicle is opened. If the determination in the step S118 is NO, the flow returns to the step S118. If the determination in the step S118 is YES, the vehicle control system 32 alerts, as shown by the step S120.

As discussed above, the alert system can be applied to the safety seat 1 and remind the parents or drivers to engage the buckle component 1662 in time to ensure the safety of the child on the safety seat 1 and avoid that the parents or driver inadvertently leave the child on the safety seat 1 in the vehicle when the parents or driver leaves the vehicle, resulting in injury to the child. In practice, the safety seat 1 may be provided with an energy storage device (e.g. a battery) to supply the electric power required by the electronic devices disposed on the safety seat 1, which will not be described in detail.

The foregoing are only preferred embodiments of the present disclosure while the protection scope thereof is not limited to the above description. Any change or substitution within the technical scope disclosed by the present disclosure should be covered by the protection scope of the present disclosure.

The invention claimed is:

1. A safety seat, comprising:
   a seat body having a seat portion and a seat back;
   a seat belt;
   a buckle assembly on the seat portion in a seesaw structure, the buckle assembly comprising:
      a rotating shaft portion pivotally connected to the seat portion,
      an actuating portion connected to the rotating shaft portion, the actuating portion having a free end that is not connected to the rotating shaft portion, wherein the free end of the actuating portion is higher than the rotating shaft portion and extends upward and in a direction toward the seat back;
      a buckle portion connected to the rotating shaft portion, the buckle portion having a free end that is not connected to the rotating shaft portion, wherein the free end of the buckle portion is higher than the rotating shaft portion and extends upward and in a direction away from the seat back; and
      a buckle component on the buckle portion; and
   an alert system comprising:
      a position sensor, disposed on the buckle assembly, the buckle assembly being rotated to trigger the position sensor when someone sits on the safety seat;
      a buckle sensor, disposed in the buckle component to sense whether the seat belt is buckled to the buckle component; and
      a control module, electrically connected to the buckle sensor and the position sensor, the control module sending a first alert signal when the control module determines that the position sensor is triggered and the seat belt is not buckled to the buckle component.

2. The safety seat according to claim 1, wherein the position sensor is a gyroscope.

3. The safety seat according to claim 1, wherein the position sensor is an accelerometer.

4. The safety seat according to claim 1, wherein the alert system further comprises an alert module electrically connected to the control module to process the first alert signal.

5. The safety seat according to claim 4, wherein the alert module comprises a light-emitting or sound-emitting component, and when the control module sends the first alert signal, the alert module emits a light or sound message.

6. The safety seat according to claim 1, wherein the alert system further comprises a communication module electrically connected to the control module and connected in communication with an external mobile device, and when the control module determines that the position sensor is triggered and a single intensity of the communication connection with the external mobile device decreases to a predetermined value, the control module sends the first alert signal.

7. The safety seat according to claim 6, wherein the communication module is further connected in communication with a vehicle control system, and when the control module determines that the position sensor is triggered and the single intensity of the communication connection with the mobile device decreases to a predetermined value, the control module sends a second alert signal to the vehicle control system so that a vehicle in which the safety seat is located sends warning message or alerts outward.

8. The safety seat according to claim 1, wherein the rotating shaft portion is pivotally connected to the seat portion through a rotating shaft or a pin.

9. The safety seat according to claim 1, wherein the position sensor is disposed on one of the buckle portion, the rotating shaft portion, and the actuating portion.

* * * * *